United States Patent Office 3,102,815
Patented Sept. 3, 1963

3,102,815
BEVERAGE FLAVOR AND PROCESS FOR ITS PRODUCTION
Clifford Henry Spotholz, Montvale, N.J., and Charles C. Elsesser, Katonah, N.Y., assignors to General Foods Corporation, White Plains, N.Y., a corporation of Delaware
No Drawing. Filed Oct. 4, 1962, Ser. No. 228,264
11 Claims. (Cl. 99—140)

This invention relates to the production of flavors and, more particularly, is concerned with the production of novel flavors which can be employed alone or in combination with other flavor and aroma constituents for use in beverages and other food products where it is desired to have flavors and aromas resembling cocoa, coffee, tea and the like. This application is a continuation-in-part of Serial No. 754,705, filed August 13, 1958, now abandoned, and Serial No. 164,399, filed January 4, 1962, now abandoned.

Heretofore, many attempts have been made to produce such a flavor by subjecting materials such as cereal grains, proteins, sugars, legumes, malt, and other raw materials to elevated temperatures and whereby a flavor product is obtained which is generally brown in color and extractable by hot aqueous materials. However, the conditions of reaction were such that the product of this process was not acceptable to the consumer in that the flavor and aroma of the product did not closely resemble that of the natural beverage.

It has now been discovered that a superior beverage or food flavor can be produced by reacting a hydrous mixture of a yeast, a saccharide, and a vegetable in a vessel by heating said mixture under conditions which prevent charring to a temperature of at least 350° F. and enclosing the gaseous constituents developed in such vessel during a period of time necessary to develop flavor, the gaseous constituents being enclosed in order to maintain a pressure sufficient to maintain a hydrous reaction condition at temperatures above 350° F. Upon development of flavor, the temperature of the reaction liquor is rapidly reduced to a point sufficient to arrest and terminate flavor development, this being achieved by rapidly reducing the temperature of the constituents in the vessel to below 250° F. and most preferably below 212° F. As will be explained more fully hereinafter, vegetables impart a heavy bodying character to the flavor product or liquor which is generally lacking when yeast and a saccharide are employed in the absence of vegetables. It is a feature of this invention, therefore, that one or more vegetables are employed in combination with yeast and one or more saccharides to balance the flavor profile of the flavor liquor, whereby fleeting flavor and aroma constituents produced when reacting yeast and saccharides are enhanced by the contributions of vegetables to the reaction mixture. While heating may be carried out under any conditions which prevent charring, such as by use of an apparatus in which turbulence is created by the temperature differential, it is preferred to employ agitating means to prevent charring of the reaction mixture during heating.

The reaction conditions required to develop flavor are such that they unexpectedly develop vapor pressures much greater than could be predicted and substantially greater than the normal presure for saturated steam at the particular temperature of operation. Indeed, this dramatic pressure devleopment forms the basis for deciding at what point the reaction occurs. The flavor-producing reaction is obscure, since a number of flavor-producing mechanisms, such as caramelization, pyrolysis, and polymerization reactions, can occur. It has been found that desired flavor products will not take place when the reactants are reacted at temperatures below 350° F., no matter what lengths of time they are heated. Flavor products developed below 350° F. have been observed to interfere with the desired flavor notes. It has also been observed that when the reaction conditions are such that a temperature of at least 350° F. is achieved rapidly, the flavor ordinarily developed by carrying out the reaction at temperatures below 350° F. are not present to the extent that they interfere with the desirable attributes of flavors developed above that temperature. Thus, should a flavor-producing reaction be carried out for a long period of time before a temperature of 350° F. and above is reached, it has been found that the quality of flavor produced is much inferior to that produced by heating the reactants to 350° F. rapidly.

In producing flavor, the reaction liquor is maintained in is hydrous condition for a holding period at or above 350° F. The length of this holding period will be dependent upon a number of factors, most significant of which are the peak reaction temperature to be achieved and the rate at which the reactants are to be heated to this peak reaction temperature, as well as the rate at which cooling is to be carried out, upon reaching said temperature. The higher the peak reaction temperature achieved, the shorter the required holding period will be. Once a reaction temperature of 350° F. is achieved, the rate at which the flavor process proceeds accelerates greatly. The reaction period above 350° F. should be as short as possible, since it is found that this reduces the opportunity for accompaniment of undesirable interfering flavors, which is borne out by organoleptic findings where an unfavorable preponderance of undesirable flavor notes is observed to interfere with the desired flavor contributions obtained at temperatures of 350° F. and above. Consequently, although the flavors process involves rapidly achieving the minimum temperature specified above and maintaining such temperature for a relatively long period of time during which improved flavor is obtained, the more preferred flavor products will be derived by further rapid elevation of the temperature of the reaction liquor, thereby occasioning a short holding period.

It is generally required that the reaction liquor be held at a peak reaction temperature of 350° F. for between 20–40 minutes when it took approximately 26 minutes to reach this reaction temperature. At a peak temperature of 380° F., it has been found that the reaction liquor should be held at that temperature for approximately 10 minutes when it took approximately 29 minutes to reach this reaction temperature. On the other hand, when a peak temperature of 405° F. is reached, no further holding is generally required when it took approximately 32 minutes to reach this reaction temperature.

Since it is important in carrying out the present flavor process that the temperature of the reaction be rapidly lowered in order to terminate those flavor-producing reactions producing desired flavor as well as those which may impart flavors detracting from the quality of the final product, the terminal temperature, and hence the holding period, for the reaction must, for practical considerations, be limited by the facility with which the reaction vessel can be cooled. Consequently, although terminal temperatures of the order of 475° F. and above are operative, the ability to thereafter cool the reaction liquor upon flavor development is limited such that it has been generally found preferable to practice terminal temperatures below, say 420° F., and more preferably in the neighborhood of 400°–405° F.

Although improved flavor products are obtained without controlling the pH of the reaction liquor, it has been observed that control of the level of acidity during reaction produces more preferred flavor. Thus, cocoa or coffee type flavors have been obtained without employing any means to control the pH during the reaction with the reaction liquor having a pH in the order of 3.5 after quenching. This is indicative of the fact that the reaction produces acid materials. However, since the presence of some water (at least about 10%) is necessary to maintain the proper development of the flavor normally associated with beverage flavors where astringency and acidity are desired, and since moisture (although its entire function is not completely understood) operates to increase the acidity of the reaction liquor, buffer salts capable of neutralizing acidity during the flavor process should be utilized. However, buffer salts are not necessary in all instances, since in many cases the materials used will possess as one of their constituents one or more compounds which will react with any acid produced to take the acid out of solution and thus maintain the conditions needed for the reaction to proceed. In addition, it is also possible to neutralize the acid which has been produced during the course of the reaction at the termination of the reaction, provided, of course, that the pH of the reaction media was lower than that necessary for production of the flavor of this invention. The control of pH during the reaction process by use of such buffering agents as calcium carbonate, sodium citrate, disodium ortho-phosphate, and other alkali and alkaline earth metal salts of carbonates, phosphates, and citrates, therefore permits the use of high levels of moisture while offering control of reaction pH, although carbonates are the most preferred. In any event, it is preferred to have a terminal pH in the reaction liquor above 4.0, the most preferred range being between 4.5 and 5.2. Control of pH is important in another respect, since in addition to fostering the production of better flavor, the flavor product will be above that level of acidity at which curdling of milk, cream or evaporated milk added to the beverage prepared from the flavor product will occur. In this latter connection, it has been found that an effective acidity control requires a terminal pH in the flavor product of approximately 5.2. In general, the upper level for optimal flavor development of many beverage flavors is at a pH below 7.0 during the aforesaid heating and holding period and the lower level is above 4.0.

As indicated herein, the role of moisture in fostering quality flavor development is at least in part one of offering acidity to the flavor of the reaction liquor. In specifying a hydrous reaction mixture, a moisture content during the holding period of at least 10% is to be understood but in order to operate this reaction under normal operating conditions, it is practical to have a sufficient amount of water to render the batch being treated fluid. For example, the ratio of two parts water to one part solids has been found generally satisfactory. In addition to the other function mentioned above, water serves to promote effective heat transfer and much of the water which is produced in the course of the reaction will participate in fulfilling this need. However, in this connection, other non-aqueous materials may be employed as heat transfer mediums, to wit, mineral oil and glycerine.

The reaction vessel which is employed should be one which is capable of maintaining a hydrous reaction mixture throughout the flavor-producing process at the temperatures practiced therefor. In general, the system which is used should be one which is able to maintain the pressure of headspace gases evolved at a temperature range from 350° F. to the practical terminal temperature. In general, these pressures will depend to some extent on the headspace provided in the reaction vessel and the ratio of moisture to solids. Since condensable as well as noncondensable vapors will be evolved in the course of the reaction at a high rate, the pressure of the headspace will be substantially greater than that of saturated steam at the reaction temperature. If it is desired to lower the reaction pressure, this may be done by bleeding the apparatus by opening a pressure vent provided for that purpose until the desired reaction pressure is reached. However, it is generally preferred that much of the volatiles developed at the elevated temperatures practiced be retained in the headspace of the reaction vessel during the flavor-producing process. In general, the reaction pressures will therefore be above the pressure of saturated steam, but on the other hand, will not be in excess of the capacity of the vessel to capture and enclose at least some of the headspace vapors which have been observed to have desirable flavor notes and are therefore preferably retained in the vicinity of the reaction liquor during the process. In the equipment of the type specified in Example 1 herein, at a reaction temperature of 405° F., a pressure of, say 300–550 p.s.i.g. would be practiced. The equipment may be either of the batch variety, such as an autoclave, or of the continuous type, such as the Votator, which consists of a feed tube with a high speed rotor in the center of the tube, which throws a thin agitated film of the material being treated onto the wall of the tube, which is heated to whatever temperature is desired, thus ensuring rapid heat transfer.

Subsequent to the reaction, it has been found that it is essential to the development of an acceptable product to quickly quench the reaction and in this manner terminate it before the reaction continues and forms an unacceptable product. If the reaction is not quenched, the harshness and acidity factors will be produced to too great an extent. Due to the fact of the high temperature operation, it is essential to quench in an efficient manner in order to terminate the desired reaction completely. The quenching step is a rapid lowering of temperature, which may be effected by circulating a cooling media, such as cold tap water, around or in the coils of the reaction vessel, rapid or "flash" venting to the atmosphere, or as a preferred mode of operation, a combination of both means. If desired, the headspace gases may be condensed within the reaction vessel into the reaction liquor, and this type product is preferred by some consumers. The temperature should preferably be rapidly lowered to below 250° F. within 4–5 minutes, at which temperature the flavor-producing reaction has terminated, and the rate of cooling may then be slowed, the total desirable cooling to room temperature being completed within 10–15 minutes. Naturally, the different methds of cooling will produce slightly different flavors and the preference of the ultimate consumer will determine the particular type of cooling to be used.

By the term "yeast" is meant either yeast in its cellular form or yeast which has been subjected to plasomolysis, autolysis, or hydrolysis. The term plasmolysis means the destruction by physical methods of the cellular nature of the yeast. The term autolysis means the partial or complete digestion of the cellular content by the enzymes present in the yeast cell. The term hydrolysis means the partial or complete degradation of the yeast by means of overaddition of any hydrolytic chemical reagent. Each of these types of the breakdown products of yeast can be used either separately or with yeast in its cellular form, or along with any number of the other types of breakdown products of yeast along with yeast in its cellular form.

The yeast are spherical, ovoid, or rod shaped sac fungi, in which the usual and dominant growth form is unicellular.

Among the yeasts which may be used are Ascosporogenous yeasts, i.e., yeasts which form both sacs and spores, and Asporogenous yeasts, i.e., yeasts which do not form spores but still form sacs. Among the Ascosporogenous yeasts which may be used are all the members of the Endomycetaceae, such as the Eremascoideae, the Saccharomycoideae, the Endomycopseae, the Endomycopsis, the Saccharomyceteae, the Saccharomyces, the Zygosaccharomyces, the Pichia, the Torulaspora, the Debaryomyces, the Hansenula, the Nadsonieae, the Saccharomycodes, the Hanseniaspora, the Nadsonia, the Nematosporoideae, the Monosporella, the Nematospora, and the Coccidiascus.

Among the Asporogenous yeasts which may be used are the Rhodotorulaceae, the Torulopsidaceae, and the Torulopsidoideae. Of the Ascosporogenous yeasts, the preferred yeast is *Saccharaomyces cerevisiae*. Of the Asporogenous yeasts, the preferred yeast is *Torula utilis*.

By the term "vegetable" is meant a non-leafy, edible, green vegetable fruit and seed such as the cucumber, eggplant, green peppers, beans, lentils, peas, soy beans, and green corn. The term vegetable fruit and seed is defined in accordance with the classification given in the text of Proudfit and Robinson, Nutrition in Diet Therapy, 11th edition, page 587 (1955). In accordance with this definition, a fruit is defined as the ripened ovary of a seed plant. The term vegetable fruit indicates that the fruit is a product of an herbaceous plants while most fruits, such as the orange or the apple which are products of woody plants, are not included within the scope of this definition.

By the term "saccharide" is meant a reducing sugar or saccharide capable of reducing Fehling's solution to give cuprous exide, or any saccharide and other material which provides a reducing saccharide or saccharides under the conditions of the reaction. The precursor material consists mainly of di- and poly-saccharides which undergo molecular cleavage to yield reducing saccharides. Such precursors are the disaccharide, sucrose; the trisaccharide, raffinose; the polysaccharide material, dextrin, which of itself comprises both reducing saccharides and precursors thereof. The reducing saccharide includes all monosaccharides, disaccharides of the gentiobiose type, the trisaccharide, manninotriose. In addition, certain saccharic materials can be used which are derived from or closely related to the monosaccharides and have similar reducing properties such as the "-uronic" acid, galacturonic acid; the desoxy sugar, rhamnose; and the penta-acetate of galactose. Thus, the term saccharide as used in the claims will be understood to include all of the reducing saccharides, and saccharic compounds and precursors which provide reducing saccharides or sugar compounds under the conditions of the reaction by degradation of the molecule or in any other manner. The sugars which may be used include the pentoses, such as the aldepentoses, methyl pentoses and keto pentoses. Examples of these are xylose, arabinose, and rhamnose. Hexoses, such as glucose, galactose, and mannose, may also be used. Reducing disaccharides, such as lactose and maltose, and other disaccharides are also capable of being used. Syrup materials, such as "Frodex", which is composed of corn syrup solids (glucose, maltose, and dextrins), can also be used since the reducing saccharides are either present in them or will be produced as a decomposition product under the conditions of this reaction. The non-reducing polysaccharides which are precursors of the reducing saccharides will decompose and produce the reducing saccharides in all cases under the conditions of this reaction. Such non-reducing polysaccharides are dextrin and raffinose. It is to be understood that the yeast may also contain the sugar, and thus the flavor can be developed from one source. In addition, starches of high molecular weight, or starch-like substances, such as inulin and glycogen, can be used, or substances such as the dextrins mentioned above, or celluloses, or hemicelluloses. Pentosans, such as gum arabic, which on hydrolysis yield arabinose, or galactans, such as agar-agar, yielding galactose on hydrolysis, or pectins, present in friuts, yielding galacturonic acid, arabinose, and galactose on hydrolysis, are also capable of being used.

As aforementioned, the flavor and process of the present invention can be characterized by the heavy bodying character contributed when one or more of the vegetables listed are part of the specified reaction mixture. Flavor panels have indentified "woody", burnt, "green", aroma notes which are distinct from the more fleeting notes produced when vegetables are not present; in flavor-by-mouth evaluation, the burnt character was also noted as well as a "green" character, together with a moderately intense bitterness. The foregoing reflects a flavor profile quite distinct from that of the flavor liquor produced from a reaction mixture from which the vegetables are absent. In terms of aftertaste, the product of the present invention had a bitter, burnt, slightly astringent character. Hence, the reaction mixture employing the vegetables provides a favorably improved balance of the reaction liquor between "top" fleeting aroma and flavor notes and heavier bodying notes.

Bitterness may be provided by the addition of bitter alkaloids such as caffein, theobromine, quinine, and the like. Other bitterness flavor factors that may be employed are the bitter polyacetates of polyhydric compounds such as the monosaccharides, glucose and levulose; the disaccharides, surose, lactose and maltose; the polyhydric alcohols, such as sorbitol and mannitol. Included in this class of bitterness factors are sucrose octaacetates, glucose triacetate, glucose tetraacetate, glucose pentaacetate, levulose triacetate, levulose tetraacetate, levulose pentaacetate, maltose octaacetate, sorbitol hexaacetate. Generally, the beta isomer of the polyacetates is much more bitter than the alpha isomer. Another class of bitterness flavor factors which may be employed are the bitter glucosides, such as quassin, naringin, the alpha-phenol-glucoside, beta-phenol-glucoside, 2,3,5,6-tetra-acetyl-alpha-phenol - glucoside, 2,3,5,6-tetra-acetyl-beta-phenol- glucoside, 2,3,5,6 - tetra-acetyl-alpha-methyl-glucoside, 2,3,5,6-tetra-acetyl - beta-methyl-glucoside. Still another group of bitterness flavor factors are the bitter acetonylated sugars such as diacetone-glucose, 3-acetyl-diacetone-glucose, 3-acetyl-monacetone-glucose, 3-benzoyl-diacetone-glucose, and 6-benzoyl-monacetone-glucose. Still another class of bitter flavor factors are salts and esters of inorganic acids such as dulcitol penta-nitrate, potassium sulfate, iso-amyl potassium sulfate, methyl-hexylcarbinol potassium sulfate.

Astringency may be provided by employing various tannins or tannates obtained by infusion or evaporation from wood, leaves or fruit of plants, e.g., extracts of the heartwood of acacias such as acacia catechu and acacia catechu sundra which are broadly referred to in the trade as "cutch," and the galls of oak, sumac, etc. Such astringency factors are generally water-soluble and include catechin having the formula $C_{15}H_{14}O_6$. Included in this class of compounds are dl-catechol, d-catechol and d-epicatechol. Among some of the useful commercially available astringency factors are various powdered products such as cocoa tannins, catechu gum, gambir gum, rhatany root, eyebright herb, white oak bark, witch hazel bark, quebracho wood extract, chestnut leaves, red oak bark, black kino gum and gum myrrh. Other astringent materials include the alums such as sodium, potassium, ammonium, and like alums.

The supernatant solution resulting from the reaction of the yeast and saccharide may be separated from the residue by any desired means, such as centrifuging, filtration, or by a combination of both means, followed by a drying in any manner desired, either alone or with a bulking agent, such as corn syrup solids. The drying may be by vacuum concentration, spray drying, drum drying, freeze drying, or any desired combination of these methods.

In the production of these flavors it has been observed that heating for 4 hours at a temperature range of 264°–298° F. or at a temperature range of 289°–338° F. will not produce a flavor which resembles the beverage flavor which has been produced by the process of this invention. The flavor of these products was comparable to that of roasted fruit, roasted cereal, or a prune-like flavor. These are generally the type flavors associated with the normal browning reactions or the caramelization of sugar. In contrast, when the reactants discussed above are reacted above 350° F., it has been found that a very short period of time will produce a beverage flavor having a cocoa or coffee-like aroma and taste. Thus, if the reactants are at the atmospheric boiling point of water, 212° F., it has been found that various time and temperature combinations may be used in order to produce the superior beverage flavor of the present invention. For instance, starting at the boiling point of water, the reactants may be heated for 26 minutes to reach a temperature of 350° F., followed by an additional heating for 6 minutes to reach a temperature of 405° F. The quenching to a temperature below 250° F. must take place within 4–5 minutes, and accordingly, one variant of this time-temperature relationship is to lower the temperature of this reaction to a point below 250° F. (240° F.) within 4 minutes, followed by lowering to a temperature of 77° F. in an additional 9 minutes of cooling. The above relationship may be observed in a 2-liter autoclave. If a larger autoclave, such as a 5-gallon autoclave, is used, the heat lag of the equipment will be somewhat greater, and accordingly, the relationships of time to temperature will be varied. Thus, if the temperature of the reactants being placed in a 5-gallon autoclave is approximately 150° F., the reactants may be heated while the autoclave is left open to a temperature of approximately 212° F. in 5 minutes. The air in the autoclave is then discharged by the steam and the exhaust vent of the autoclave is closed. An additional 3 minutes will be required for this procedure. The reactants have, therefore, been in the autoclave for 8 minutes. However, for purposes of comparison to the smaller autoclave discussed above (the 2-liter autoclave) they are now at the same temperature and the same conditions as the reactants in the smaller 2-liter autoclave. The reactants may then be heated to 350° F. in an additional 27 minutes, thus having been in the autoclave for a total time of 35 minutes. They are then heated to 400° F. in an additional 8 minutes and to 403° F. in an additional 8 minutes and to 403° F. in an additional 5 minutes over and above the length of time required to reach 400° F. The reactants have then been in the autoclave for 48 minutes. The heating coils of the autoclave are then shut and the autoclave should be cooled to a temperature below 250° F. within 4–5 minutes, followed by a cooling to a temperature of 70° F. in an additional 8 minutes. Thus, the reactants have been in the autoclave for approximately 1 hour after their insertion at 150° F.

The following examples illustrate embodiments of the invention, but it is to be understood that these examples are for purposes of illustration and that the invention is not limited thereto, since various changes can be made by those skilled-in-the-art without departing from its scope and spirit.

*Example 1*

Two hundred fifty grams dried *Torula utilis* yeast, 150 grams corn syrup solids (Frodex–42 D.E.) 20 grams calcium carbonate, 10 grams red bell peppers (dhyd.), 10 grams dry green split peas, 10 grams dry green lentils (450 grams of dry mix), and 900 ml. water are thoroughly mixed and then placed in a Parr 2-liter pressure reaction autoclave.

The Parr 2-liter pressure reaction autoclave is a stainless steel reaction bomb with a motor driven stirrer and an electric bomb heater, all assembled on a steel base plate. It has fittings for introducing compressed gas while agitating and heating, or for removing liquid samples while under pressure, or for bleeding gas from the bomb chamber. The bomb also has a pressure gauge, and a means for controlling the temperature by a variable voltage transformer mounted on the base plate. The stirrer shaft can be cooled with circulating water. The temperature is read from a dial thermometer inserted in the bomb thermowell, and there is an internal cooling coil, through which the bomb can be cooled by circulating cold tap water at 50°–70° F. The time of heating required to reach a temperature of 400° F. is approximately one-half hour, varying from 30–40 minutes.

The reaction mixture is then brought to the atmospheric boiling point, the autoclave sealed, and the reactants may then be heated to 350° F. in 27 minutes and to 405° F. in an additional 7 minutes with continuous agitation, followed by immediately quenching to 120° F. within 5 minutes, followed by reducing to room temperature in a total time of 12 minutes by running cold water through the internal cooling coils. The solution is then filtered, and the filtrate diluted to form a 2% solids concentration aqueous solution.

*Example 2*

One hundred twenty-five pounds of *Torula utilis* yeast, 75 pounds of corn syrup solids (Frodex–42 D.E.), 10 pounds of calcium carbonate, 5 pounds of dried red bell peppers, 5 pounds of dried green peas, 5 pounds of dried lentils (225 pounds total weight) were ground together in a Fitzpatrick Mill with a 40 mesh screen and added to a 130-gallon autoclave containing 338 pounds of water at an elevated tmeperature (180° F.) and thoroughly mixed.

The autoclave used is a 130-gallon type 316 stainless steel (corrosion resistant) jacketed pressure vessel with internal baffles to facilitate agitation during operation. The internal chamber is constructed for a working pressure of 500 p.s.i.g. and the jacket for 300 p.s.i.g.

Agitation is provided by propeller type mixers mounted on a shaft fixed over the autoclave chamber and entering it through a packed stuffing box and driven by a 5 horsepower motor which provides variable speeds from 200–420 revolutions per minute through a gear box.

The above agitation unit is mounted on an 18½ inch raised face flange which fits on a 17½ inch high, 16 inch outside diameter neck on the top of the autoclave. Around the periphery of this neck are the following openings:

(1) Two 6 inch raised face blind flange ports for loading, cleaning, and inspection.

(2) One 1¼ inch flanged opening connected by a pipe and valve arrangement to receive water directly into the autoclave chamber.

(3) One 1¼ inch flanged opening piped and valved to permit over-flow to waste.

(4) One 1¼ inch flanged opening piped and valved to permit pumping of liquid into the autoclave from an adjacent tank system.

(5) A ½ inch thermowell is provided for measuring temperature in the vessel by the employment of an iron-constantan thermocouple inserted in an oil liquid in the thermowell.

(6) A ½ inch coupling is provided to measure internal pressure by means of a Bourdon type circular faced pressure gauge reading from 0–600 p.s.i.g. A pressure relief valve venting the autoclave to waste and set for 500 p.s.i.g. is also connected to this opening.

Exclusive of the neck, the autoclave interior is 46 inches in height with an inside diameter of 28½ inches. A 1½ inch firm seating, high pressure valve (Strahman) is provided in the base of the autoclave to permit entry of steam or exit of product.

The jacket of the autoclave is provided with connections for entry of steam or water and exit ports for steam and water.

With the raw materials in the autoclave chamber, the agitator operating at 220 revolutions per minute, the top vent line open to the atmosphere, and all other valves closed, the bottom Strahman valve is opened to permit steam injection into the autoclave chamber from a steam compressor to provide heat for the reaction. Steam is added at maximum rate for 6 minutes until evidence of boiling occurs by the emanation of steam vapor from the vent. The emanation is continued for 2 minutes to purge the air from the chamber and the vent valve is then closed.

Using a direct reading potentiometer connected to the iron-constantan thermocouple, the temperature is plotted and variations from the desired rate of heating are controlled by opening or closing the steam inlet valves on the compressor.

In this example the steam is controlled to allow heating in 26 minutes to a temperature of 350° F. and an internal pressure of 215 p.s.i.g. Heating was then continued to provide a further temperature increase during the next 15 minutes to 390° F. and an internal pressure of 390 p.s.i.g. At this point, steam addition was stopped, and during the ensuing 3 minutes, the temperature rose to 392° F. and to the pre-selected pressure cut-off point of 440 p.s.i.g. Cooling water was immediately started to the jacket and following the lapse of one-half minute, product discharge valves were opened to allow rapid flashing of the autoclave contents to an open collection tank (120-gallon capacity—type 316 stainless steel vessel). A total time of 7 minutes is required to empty the autoclave, at which time all the material has been cooled to a point below 212° F. Venting of gases from the top of the autoclave is also employed during flashing to reduce pressure and facilitate the rapidity of the flashing operation. While the flashing is in operation, that material already collected is further cooled by pumping through a 17 plate water cooled heat exchanger, which results in a final temperature of 70° F. The total elapsed time from peak pressure cut-off until all the product reaches room temperature is 11½ minutes.

The resultant cooled slurry is then pumped to a basket type centrifuge (Tollhurst 26 inch diameter) for separating the residual solids from the liquor containing those desirable soluble ingredients. The liquor was then further clarified by passing through an additional centrifugation step employing a high speed Sharples centrifuge. In this example, a total weight of 388 pounds of liquor having a pH of 4.38 was collected at a concentration of 19.5%. The residual cake was discarded. Normal drying procedures may be employed to prepare a tan powder capable of being readily reconstituted to give a flavorful beverage. In this example, the clarified liquor was concentrated to 27% solids in a vacuum type, low residence time evaporator (Rodney-Hunt Turba-Film), adjusted to a pH of 4.8 (5.8 grams of sodium-citrate per 100 grams of solids) to prevent curdling of the reconstituted product upon cream addition by the utlimate consumer, and then dried in a vertical spray drier.

In addition to being used as either a beverage flavor or the base for a beverage flavor in combination with various astringency and bitterness factors, as are discussed above, the products of the process of this invention may be used in any type food where the particular beverage flavor is used as a base. These products may therefore be used as the base flavors for icings, confections, or candy of any nature.

While the present invention has been described with particular reference to specific examples, it is not to be limited thereby, but reference is to be had to the appended claims for a definition of its scope.

What is claimed is:

1. A process for producing a beverage flavor comprising heating, under conditions which prevent charring, a reaction mixture of a yeast, a saccharide, a vegetable and at least 10% water in a partially filled reaction vessel to rapidly achieve an elevated reaction temperature between 350° and 475° F. and cause substantial evolution of vapors from said hydrous reaction mixture in amounts sufficient to cause a headspace pressure substantially greater than the normal pressure for saturated steam at the reaction temperature, enclosing the vapors evolved in the course of the reaction in the headspace of the reaction vessel while maintaining said hydrous reaction condition, the headspace pressure of gaseous constituents in the reaction vessel being maintained thereby over the normal pressure for saturated steam at the reaction temperature, the reaction temperature being thereby elevated to a point in the reaction whereat desired flavors are produced at a rate faster than undesirable interfering flavors, holding said conditions for a holding period sufficient to develop flavor, and upon development of said flavor rapidly reducing the temperature of the reaction liquor in said vessel to below 250° F. to arrest flavor development.

2. A process according to claim 1 wherein the flavor is developed by achieving a peak reaction temperature substantially between 350° F. and 420° F., the required holding period at a peak reaction temperature of 350° F. ranging from 20–40 minutes and diminishing as the peak reaction period is increased.

3. A process according to claim 2 in which the supernatant solution is separated from the reaction liquor and dried to a powder.

4. A process according to claim 3 wherein the flavor-producing reaction mixture contains an acid-neutralizing substance of a character and amount sufficient to yield a reaction liquor above 4.5 and below 7.0.

5. A process according to claim 4 wherein the acid-neutralizing substance is calcium carbonate.

6. A process according to claim 4 wherein the reaction mixture is rapidly carried to a peak reaction temperature in the neighborhood of about 405° F., whereupon the reaction liquor is rapidly cooled to a temperature below 212° F.

7. A process according to claim 6 wherein the flavor-producing reaction mixture contains an acid-neutralizing substance of a character and amount sufficient to provide a reaction liquor having a pH between 4.5 and 5.2.

8. A process according to claim 7 wherein the acid neutralizing substance is calcium carbonate.

9. A process according to claim 1 wherein the vegetable is selected from the group consisting of green peppers, beans, lentils, peas and mixtures thereof.

10. A process of claim 9 in which the saccharide is a reducing saccharide.

11. The product of the process of claim 1.

References Cited in the file of this patent

UNITED STATES PATENTS

| | | |
|---|---|---|
| 92,376 | Shan | July 6, 1869 |
| 1,133,037 | Kellogg | Mar. 23, 1915 |
| 1,198,393 | Kellogg | Sept. 12, 1916 |
| 1,544,649 | Kellogg | July 7, 1925 |
| 1,701,200 | Willstatter | Feb. 5, 1929 |
| 1,742,261 | Klein | Jan. 7, 1930 |
| 1,956,426 | McKinnis | Apr. 24, 1934 |